United States Patent
Baughman et al.

(10) Patent No.: US 11,645,498 B2
(45) Date of Patent: May 9, 2023

(54) SEMI-SUPERVISED REINFORCEMENT LEARNING

(71) Applicant: International Business Machines Corporation, Armonk, NY (US)

(72) Inventors: Aaron K. Baughman, Cary, NC (US); Stephen C. Hammer, Marietta, GA (US); Gray Cannon, Miami, FL (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 16/582,092

(22) Filed: Sep. 25, 2019

(65) Prior Publication Data
US 2021/0089869 A1    Mar. 25, 2021

(51) Int. Cl.
  *G06N 3/047*    (2023.01)
  *G06F 17/18*    (2006.01)
  (Continued)

(52) U.S. Cl.
  CPC ............ *G06N 3/047* (2023.01); *G06F 17/18* (2013.01); *G06N 3/048* (2023.01); *G06N 20/00* (2019.01); *G10L 15/16* (2013.01)

(58) Field of Classification Search
  CPC .... G06N 3/0472; G06N 3/0481; G06N 20/00; G06N 3/04; G06N 3/08; G06N 3/006; G06N 3/045; G06N 7/01; G06N 3/084; G06N 3/088; G06N 3/044; G06N 3/047; G06N 20/10; G06N 3/008; G06F 17/18; G10L 15/16; G06V 10/82; G06V 10/764;
  (Continued)

(56) References Cited

U.S. PATENT DOCUMENTS 11,132,211 B1 *    9/2021    Tang ................ B60W 60/00
2017/0132512 A1    5/2017    Ioffe
(Continued)

FOREIGN PATENT DOCUMENTS

| CN | 107263464 A | 10/2017 |
| JP | 201768566 A | 4/2017 |
| WO | 2018226492 A1 | 12/2018 |

OTHER PUBLICATIONS

Amodei et al., "Concrete Problems in AI Safety," arXiv:1606.06565v2, Jul. 25, 2016, pp. 1-29.
(Continued)

*Primary Examiner* — Michael S Osinski
(74) *Attorney, Agent, or Firm* — Eric W. Chesley

(57) ABSTRACT

Provided is a method, a system, and a program product for determining a policy using semi-supervised reinforcement learning. The method includes observing a state of an environment by a learning agent. The method also includes taking an action by the learning agent. The method further includes observing a new state of the environment and calculating a reward for the action taken by the learning agent. The method also includes determining whether a policy related to the learning agent should be changed. The determination is conducted by a teaching agent that inputs the state of the environment and the reward as features. The method can also include changing the policy related to the learning agent upon a determination that a label outputted by the teaching agent exceeds a reward threshold.

18 Claims, 6 Drawing Sheets

(51) Int. Cl.
*G06N 20/00* (2019.01)
*G10L 15/16* (2006.01)
*G06N 3/048* (2023.01)

(58) Field of Classification Search
CPC ........ G06V 20/10; G06V 20/56; G06V 20/58; B60W 2520/10; B60W 2540/12; B60W 2050/0008; B60W 2520/105; B60W 2050/0075; G05D 1/0221; G05D 2201/0213; G05D 1/0088; G05D 1/0214; G05D 1/0274; G05D 1/0223
See application file for complete search history.

(56) References Cited

U.S. PATENT DOCUMENTS

| | | | |
|---|---|---|---|
| 2019/0019061 A1 | 1/2019 | Trenholm et al. | |
| 2019/0310636 A1* | 10/2019 | Halder | B60W 50/00 |
| 2019/0354859 A1* | 11/2019 | Xu | G06N 3/006 |
| 2020/0070844 A1* | 3/2020 | Goto | G06Q 30/02 |
| 2020/0097003 A1* | 3/2020 | Wray | G05D 1/0088 |
| 2020/0104680 A1* | 4/2020 | Reed | G06V 10/764 |
| 2020/0192390 A1* | 6/2020 | Luo | B60W 30/18 |
| 2020/0265305 A1* | 8/2020 | Budden | G06N 20/00 |
| 2021/0018882 A1* | 1/2021 | Kimura | B60W 60/001 |
| 2021/0019644 A1* | 1/2021 | Kim | G06N 20/00 |
| 2021/0029255 A1* | 1/2021 | Kiriyama | H04N 1/00082 |
| 2021/0034970 A1* | 2/2021 | Soyer | G06N 3/0454 |
| 2021/0036640 A1* | 2/2021 | Fujita | H02P 21/0014 |
| 2021/0042584 A1* | 2/2021 | Higa | G06K 9/6263 |
| 2021/0056408 A1* | 2/2021 | Brandt | G06N 3/04 |
| 2021/0063974 A1* | 3/2021 | Okawa | G05B 17/02 |
| 2021/0078170 A1* | 3/2021 | Jiang | B25J 9/161 |
| 2021/0089869 A1* | 3/2021 | Baughman | G06N 3/0472 |
| 2021/0119881 A1* | 4/2021 | Shirazipour | H04W 24/02 |
| 2021/0171025 A1* | 6/2021 | Ishikawa | B60W 30/0956 |
| 2021/0187733 A1* | 6/2021 | Lee | G06N 20/00 |
| 2021/0201156 A1* | 7/2021 | Hafner | G06N 3/084 |
| 2021/0229275 A1* | 7/2021 | Komaike | B25J 9/163 |
| 2021/0295214 A1* | 9/2021 | Katayama | A61B 5/7267 |
| 2021/0331677 A1* | 10/2021 | Kim | G06N 3/0454 |
| 2021/0365769 A1* | 11/2021 | Chae | G06V 10/82 |
| 2021/0387343 A1* | 12/2021 | Imajo | B25J 9/1671 |
| 2021/0397961 A1* | 12/2021 | Choi | G05D 1/0274 |
| 2021/0398061 A1* | 12/2021 | Acuna Agost | G06N 3/08 |
| 2021/0402598 A1* | 12/2021 | Terasawa | B25J 9/1612 |
| 2021/0402611 A1* | 12/2021 | Hiroya | B25J 9/1697 |
| 2022/0027708 A1* | 1/2022 | Mori | G06N 3/08 |
| 2022/0092441 A1* | 3/2022 | Zhu | G16H 50/70 |
| 2022/0143823 A1* | 5/2022 | Yoshida | G06N 3/088 |
| 2022/0193914 A1* | 6/2022 | Liu | G06T 7/70 |
| 2022/0197230 A1* | 6/2022 | Hiraoka | G05B 13/0265 |
| 2022/0208336 A1* | 6/2022 | Neumann | G06N 5/003 |
| 2022/0230097 A1* | 7/2022 | Cha | G06N 7/005 |
| 2022/0261833 A1* | 8/2022 | Shang | G06N 3/08 |
| 2022/0326664 A1* | 10/2022 | Kaberg Johard | G05B 13/0265 |
| 2022/0342398 A1* | 10/2022 | Turner | G06N 3/006 |

OTHER PUBLICATIONS

Cuayahuitl et al., "Machine Learning for Interactive Systems and Robots: A Brief Introduction," MLIS '13 Proceedings of the 2nd Workshop on Machine Learning for Interactive Systems: Bridging the Gap Between Perception, Action and Communication, Aug. 2013, ACM, pp. 19-28.

Everitt et al., "Reinforcement Learning with a Corrupted Reward Channel," arXiv:1705.08417v2, Aug. 22, 2017, pp. 1-24.

Finn et al., "Generalizing Skills with Semi-Supervised Reinforcement Learning," arXiv:1612.00429v2, Published as a conference paper at ICLR 2017, Mar. 9, 2019, pp. 1-11.

Jurek et al., "A Novel Ensemble Learning Approach to Unsupervised Record Linkage," Information Systems, 2017, 51 pages.

Mohammadi et al., "Semi-supervised Deep Reinforcement Learning in Support of IoT and Smart City Services," IEEE Internet of Things Jounal, arXiv:1810.04118v1, Oct. 9, 2018, pp. 1-11.

Park et al., "Semi-Supervised Reinforced Active Learning for Pulmonary Nodule Detection in Chest X-rays," 1st Conference on Medical Imaging with Deep Learning (MIDL), 2018, 7 pages.

Zhang et al., "A Study on Overfitting in Deep Reinforcement Learning," arXiv:1804.06893v2, Apr. 20, 2018, pp. 1-25.

Schatsky et al., "Bringing the power of AI to the Internet of Things," Wired, 2018, 6 pages. https://www.wired.com/brandlab/2018/05/bringing-power-ai-internet-things/.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

SEMI-SUPERVISED REINFORCEMENT LEARNING

BACKGROUND

The present disclosure relates to reinforcement learning, and more specifically, to semi-supervised reinforcement learning involving moving objects.

Reinforcement learning agents interact with an environment by receiving an observation that characterizes the current state of the environment, and in response, performing an action. Feedback is provided to the reinforcement learning agent in the form of a reward. The reward can be either a negative reward (e.g., a penalty to the agent), or a positive reward. A sequence of the most useful actions is considered a policy the agent learns in order to be able to make the best decisions in terms of the highest immediate and cumulative reward. A policy defines the agent's way of behaving at a given time. In other words, a policy can be a mapping from perceived states of the environment to actions taken when in those states.

Semi-supervised learning is a branch of machine learning that utilizes both labeled and unlabeled data to train a model. During training cycles, semi-supervised training methods attempt to improve the label of supervised learning by incorporating unlabeled samples. Typically, semi-supervised learning is implemented when there is a high availability of unlabeled samples coupled with the limited availability of correctly labeled samples.

SUMMARY

Embodiments of the present disclosure include a method for determining a policy using a semi-supervised reinforcement learning model. The method includes observing a state of an environment by a learning agent. The method also includes taking an action by the learning agent. The action taken is based upon a task assigned to the learning agent and the state of the environment observed by the learning agent. The method further includes observing a new state of the environment and calculating a reward for the action taken by the learning agent. The method also includes determining whether a policy related to the learning agent should be changed. The determination is conducted by a teaching agent that inputs the state of the environment and the reward as features. The method can also include changing the policy related to the learning agent upon a determination that a label outputted by the teaching agent exceeds a reward threshold.

Additional embodiments are directed to a system to determine a policy using a semi-supervised reinforcement learning model, including at least one processing component and at least one memory component. The system also includes a learning agent configured to take an action based on a state of an environment and a policy related to the learning agent. The action taken produces a new state of the environment. The system also includes a neural network configured to produce a probability for the action taken. The new state and a reward related to the action are inputted into the neural network to produce the probability. The system further includes a teaching agent configured to produce a label. The new state of the environment and the reward are inputted into the teaching agent as features to produce the label. The system also includes a remote sensor configured to detect an object within the environment and determine a velocity and an acceleration related to the object. The remote sensor is further configured to provide the teaching agent with a velocity feature vector and an acceleration vector. The system can also include a natural language processor configured to analyze speech and/or text provided by an administrator observing the action taken by the learning agent. The natural language processor is further configured to provide the teaching agent with an output.

Further embodiments are directed to a computer program product for determining causes, which can include a computer readable storage medium having program instructions embodied therewith, the program instructions executable by a processor to cause the device to perform a method. The method include observing a state of an environment by a learning agent. The method also includes taking an action by the learning agent. The action taken is based upon a task assigned to the learning agent and the state of the environment observed by the learning agent. The method further includes observing a new state of the environment and calculating a reward for the action taken by the learning agent. The method also includes determining whether a policy related to the learning agent should be changed. The determination is conducted by a teaching agent that inputs the state of the environment and the reward as features. The method can also include changing the policy related to the learning agent upon a determination that a label outputted by the teaching agent exceeds a reward threshold.

BRIEF DESCRIPTION OF THE DRAWINGS

These and other features, aspects, and advantages of the embodiments of the disclosure will become better understood with regard to the following description, appended claims, and accompanying drawings where:

Figure 1:
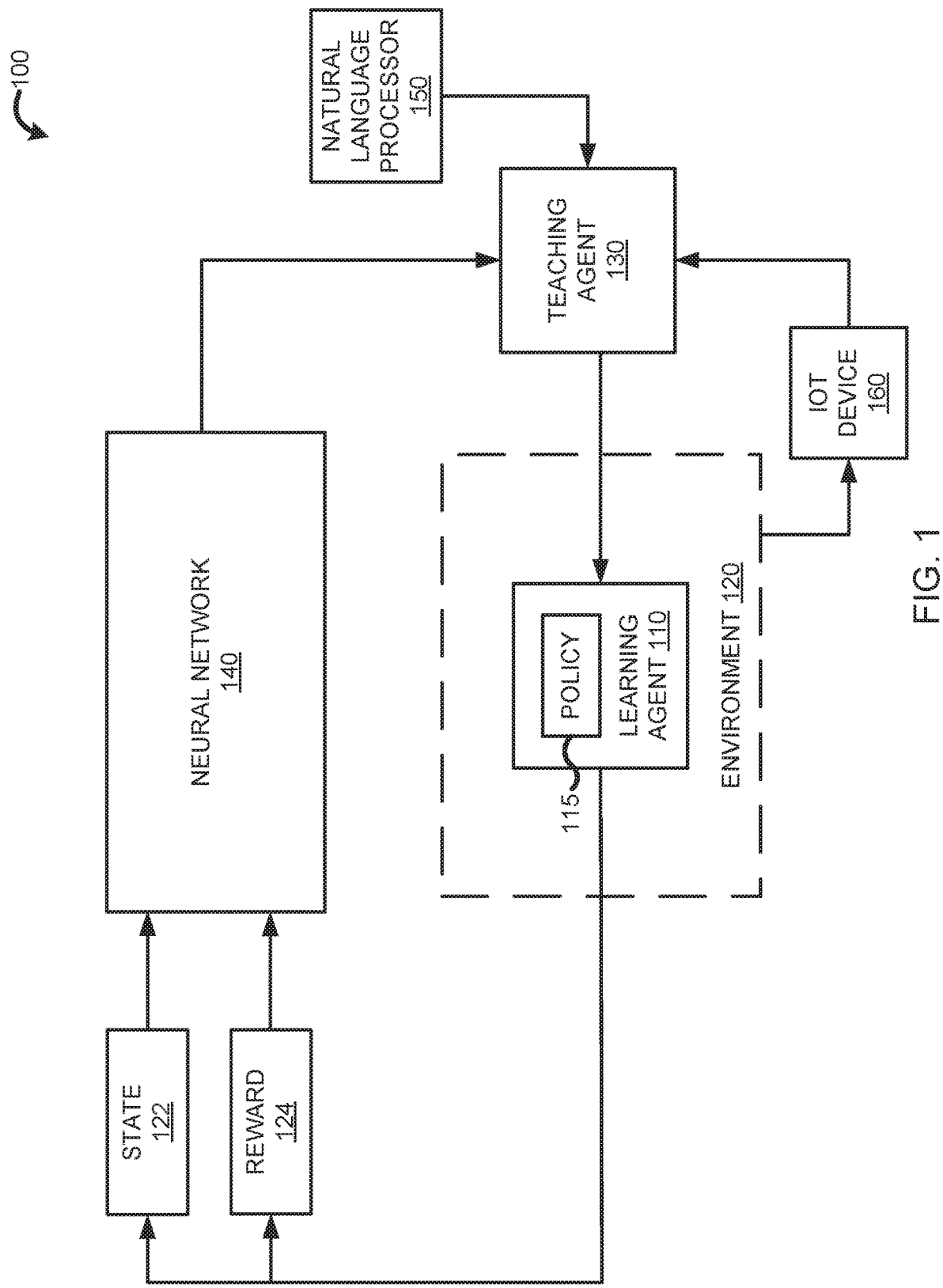
FIG. 1 illustrates a block diagram of a semi-supervised reinforcement learning system, according to embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numeral are used to designate like parts in the accompanying drawings.

DETAILED DESCRIPTION

The present disclosure relates to reinforcement learning, and more specifically, to semi-supervised reinforcement learning involving moving labels. While the present disclosure is not necessarily limited to such applications, various aspects of the disclosure may be appreciated through a discussion of various examples using this context.

Reinforcement learning is a field of machine learning where an agent learns by interacting with an environment. The agent is not taught what actions to take, but rather, the agent learns by being rewarded for its actions. An agent will start performing actions which result in the agent receiving positive rewards instead of the actions that cause the agent to receive negative rewards. An agent and an environment interact continually, where the agent selects actions and the environment responds to those actions by presenting a new state of the environment to the agent. The agent continues to take actions until it achieves a goal or task. As such, an agent can sense the state of the environment to at least some degree and can take actions that affect the state of the environment.

A policy can define the way an agent behaves at a given time. More specifically, a policy is a mapping from observed states of the environment to the actions taken by the agent while in those states. If an action selected by the policy is followed by a low reward, then the policy may be changed to select some other action in that situation in the future.

A trade-off between exploration and exploitation also exists within reinforcement learning. The agent can either exploit what it already knows in order to obtain the reward, or it can explore in order to discover a better action that can increase its future reward. The balance between exploration and exploitation can be adjusted to optimize the overall effectiveness of the agent.

Supervised learning is another field of machine learning where learning is achieved from a training set of labeled examples provided by an administrator. An example can include a description of a situation together with a label. The label can be considered as the correct action the system should take for a given situation. The objective of this type of machine learning is to have the system generalize responses for situations not present in the training set. Semi-supervised learning is another field of machine learning that utilizes both labeled and unlabeled examples to train a model. During training cycles, semi-supervised training methods attempt to improve the generalization of supervised learning by incorporating unlabeled samples. However, in interactive problems, such as detection of a moving object, it is impractical to obtain a set of labeled examples of desired behavior that is accurate and representative of all situations an agent can encounter.

Reinforcement learning algorithms can be integrated with semi-supervised learning methods by introducing unlabeled episodes to a learning agent. An unlabeled episode can be described as a training cycle where the agent does not receive a reward for the actions taken in an environment. During these unlabeled episodes, training data can be generated by collecting the states of the environment along with the rewards for the actions taken by the learning agent.

Within traditional semi-supervised learning, the label should not change. Otherwise, label entropy can occur. As a result, incorrect generalizations may occur when testing a model. With semi-supervised reinforcement learning, the agent may learn a basic policy to achieve a task but not one that is optimal for a given environment. This can be due to an agent taking more actions than necessary to achieve a task. The additional actions can accelerate the change in the label of a target causing label entropy and poor performance.

Embodiments of the present disclosure may overcome the above, and other problems, by implementing a teaching agent into a semi-supervised reinforcement learning system to offset label entropy. A teaching agent can provide an independent mechanism to learn labels in a controlled manner as an environment changes state. The teaching agent can then be used to train a learning agent as needed. A semi-supervised reinforcement learning system may be configured to train a learning agent by allowing the learning agent to explore or exploit an environment. The semi-supervised reinforcement learning system may be further configured to train a teaching agent in a controlled environment with true class labels. During unlabeled episodes, the learning agent is not provided with rewards for the actions taken to states of the environment. However, a teaching agent can monitor the actions taken by the learning agent and determine whether to train the learning agent or allow the learning agent to change its policy.

More specifically, the semi-supervised reinforcement learning system described herein monitors the actions of a learning agent with the implementation of a teaching agent. The teaching agent can be configured to test the learning agent and determine whether the learning agent has overfit or underfit its actions. A determination can be made as to whether the action should change the policy of the learning agent. As such, a learning agent is able to learn from a teaching agent through semi-supervised learning so that the policy for the learning agent converges with the label of the teaching agent within a minimum number of training epochs.

For example, a learning agent can be given a task, or goal, and allowed to explore its environment. The learning agent can take actions within the environment, measure the reward for that action, and begin to learn its policy. The teaching agent can maintain testing and training data which are labeled by an administrator. The teaching agent can test the learning agent to see if the actions have overfit or underfit the task. A determination can be made as to whether the learning agent can alter its policy based on the actions it has taken during testing. Feature vectors of objects within the environment, such as placement data from an internet of things (IoT) device (e.g., remote sensor) can be used by the teaching agent to determine when to enable changes to the policy.

Embodiments of the present disclosure include a natural language processor. The natural language processor can analyze speech and/or sentences in a natural language, such as English, and translate it into actions and inputs for the semi-supervised reinforcement learning system. For example, speech recognition, context recognition, context reference, as well as syntactic and semantic analysis, and the like are some functions the natural language processor can perform.

In some embodiments, the teaching agent can learn by analyzing the natural language of an administrator. A sentiment analysis on the language can be performed to determine whether the language is positive or negative feedback on the modification of the labels. Also, keywords related to the training process can be analyzed to allow the teaching agent to determine the direction of change to be made to the policy of the learning agent.

In some embodiments, natural language feedback can be used by the teaching agent to adjust the exploration versus exploitation tradeoff related to the learning agent. The exploration can be denoted by epsilon $\varepsilon$ and exploitation can be denoted as 1 minus $\varepsilon$. The epsilon can correspond to the greater likelihood of modifying the policy. Additionally, epsilon can be adjusted based on the criticality of a situation. In critical situations, the performance of the system at that moment is relatively more important than the future benefits of exploration. Therefore, as criticality increase, embodiments of the disclosure reduce the epsilon. The natural language of administrators can be used to assess, at least partially, the criticality of a situation. For example, the tone or language used by an administrator can indicate that the system is in a critical situation.

In some embodiments, a reward threshold is used to determine whether to allow the learning agent to change its policy. For example, if an action performed by the learning agent results in a reward that exceeds the reward threshold, then the learning agent is permitted to change its policy.

Embodiments of the disclosure include a deep neural network that inputs the state of the environment and the reward for the action taken by the learning agent as input into the network. The output of the deep neural network can include probabilities that map to an action.

In some embodiments, the deep neural network includes a unbiased layer and a biased layer. The components that make up the privileged values can determine the contribution that each type of class has on the training. The merging of the biased path and the unbiased path can be controlled with a limit function.

It is to be understood that the aforementioned advantages are example advantages and should not be construed as limiting. Embodiments of the present disclosure can contain all, some, or none of the aforementioned advantages while remaining within the spirit and scope of the present disclosure.

FIG. 1 is a block diagram illustrating a semi-supervised reinforcement learning system 100, according to embodiments of the present disclosure. The semi-supervised reinforcement learning system 100 includes a learning agent 110, an environment 120, a state 122, a reward 124, a teaching agent 130, a neural network 140, a natural language processor 150, and an Internet of Things (IoT) device 160. The learning agent 110 includes a policy 115.

The learning agent 110 is a component of the semi-supervised reinforcement learning system 100 configured to take an action based on an observed state of the environment 120 and a policy 115. The observed state of the environment 120 can be received from an array of various inputs. For example, the learning agent 110 can observe the state of the environment 120 from an air flow meter, motion sensor, light sensor, radar sensor, velocity sensor, carbon dioxide sensor, smoke detector, radio detection sensor, actinometer, electrochemical gas sensor, gyroscope, altimeter, and the like.

In some embodiments, the learning agent 110 implements reinforcement learning using tabular solution methods. For example, the learning agent 110 can implement finite Markov decision processes (MDPs), dynamic programming, Monte Carlo methods, temporal-difference learning, eligibility traces, tabular methods, trajectory sampling, prioritized sweeping, and the like. In some embodiments, the learning agent 110 implements reinforcement learning using approximate solution methods. For example, the learning agent 110 can implement on-policy approximation of action values, gradient-descent methods, linear methods, function approximation, off-policy approximation of action values, policy approximation, and the like.

The learning agent 110 is further configured to balance exploring new avenues to take better actions in the future with exploiting what is already known. The learning agent 110 can balance this "exploration exploitation tradeoff" in various ways. For example, the learning agent 110 can balance the exploration exploitation tradeoff by implementing action-value methods, incremental methods, with optimistic initial values, upper-confidence-bound action selection techniques, with associative search, and the like.

The policy 115 is a component of the learning agent 110 configured to define the way the learning agent 110 behaves at a given time, according to embodiments of the present disclosure. The policy 115 can be a mapping from an observed state of the environment 120 to actions to be taken when in that state. In some embodiments, the policy 115 is a function that is computed prior to taking an action. In some embodiments, the policy 115 is a lookup table that is searched prior to taking an action.

The environment 120 is a territory that the learning agent 110 interacts with to observe a state, according to embodiments of the present disclosure. In some embodiments, the environment 120 is modeled by MDPs. An MDP can consist of a set of finite environment states, a set of finite actions, and a set of finite rewards for those actions. The MDP, in regard to reinforcement learning, attempts to maximize the earned rewards for a given task. In some embodiments, the environment 120 is a real-world environment where no prior knowledge of the dynamics of the environment 120 exist.

The state 122 is a new state of the environment 120 after the learning agent 110 has taken an action, according to embodiments of the present disclosure. The state 122 can be a new situation the learning agent 110 is in once an action is taken. For example, if an action is to move closer to an object, the state 122 can reflect the new position of the learning agent 110 relative to the object once the learning agent 110 has moved.

The reward 124 is the feedback for an action performed by the learning agent 110, according to embodiments of the present disclosure. In some embodiments, the reward is defined such that it reflects the closeness of the state 122 to a true class label. The true class label can be defined as the most appropriate action the learning agent 110 can take given a state of the environment 120. In some embodiments, the reward 124 is not immediately provided to the learning agent 110. For example, the learning agent 110 can take actions during an unlabeled episode. The unlabeled episode can be described as a training cycle where the learning agent 110 does not receive the reward 124 for the actions taken in an environment. The reward 124 can form part of the basis for altering the policy 115. If an action selected by the policy 115 is followed by a low reward 124, then the policy 115 can be changed to select some other action for that situation in the future.

The teaching agent 130 is a component of the semi-supervised reinforcement learning system 100 configured monitor the actions taken by the learning agent 110, according to embodiments of the present disclosure. The teaching agent 130 is further configured to be trained in a controlled environment with true class labels of states of the environment 120. The teaching agent can output a generalized label, based on inputs received from the semi-supervised reinforcement learning system 100, to evaluate the actions taken by the learning agent 110 and decide whether or not to allow the learning agent 110 to alter its policy 115.

The neural network 140 is a component of the semi-supervised reinforcement learning system 100 configured to approximate a value function, according to embodiments of the present disclosure. A value of a state can be defined as the total amount of reward the learning agent 110 can expect to accumulate over the future, starting from the state 122. A value can indicate the long-term desirability of states after taking into account the states that are likely to follow. For example, the state 122 may yield a low reward 124, but may have a higher value because the state 122 is followed by other states that yield higher rewards. As such, the value function is an algorithm configured to efficiently estimate values. The neural network 140 inputs the state 122 and the reward 124 to approximate an optimal value function. The value function can find the maximum sum of rewards achievable by the policy 115 after taking an action.

The natural language processor 150 is a component of the semi-supervised reinforcement learning system configured to analyze and process natural language, according to embodiments of the present disclosure. The natural language processor 150 is further configured to recognize speech, understand natural language, and transform structured data into natural language. The natural language processor 150 can receive input from an administrator and analyze that input to provide to the teaching agent 130. For example, an administrator can observe the actions taken by the learning agent 110 and respond to that action. The natural language processor 150 can capture the response from the administrator and analyze it to determine whether to provide that information to the teaching agent 130.

The IoT device 160 is a component of the semi-supervised reinforcement learning system 100 configured to detect objects within the environment 120 and provide sensory data to the teaching agent 130, according to embodiments of the present disclosure. The IoT device can be a nonstandard computing device wirelessly connected to a network capable of transmitting data to the teaching agent 130. For example, the IoT device 160 can be a machine vision device, ambient light detector, position sensor, motion sensor, temperature sensor, accelerometer, pressure sensor, camera, cellphone, gyroscope, and the like.

Figure 2:
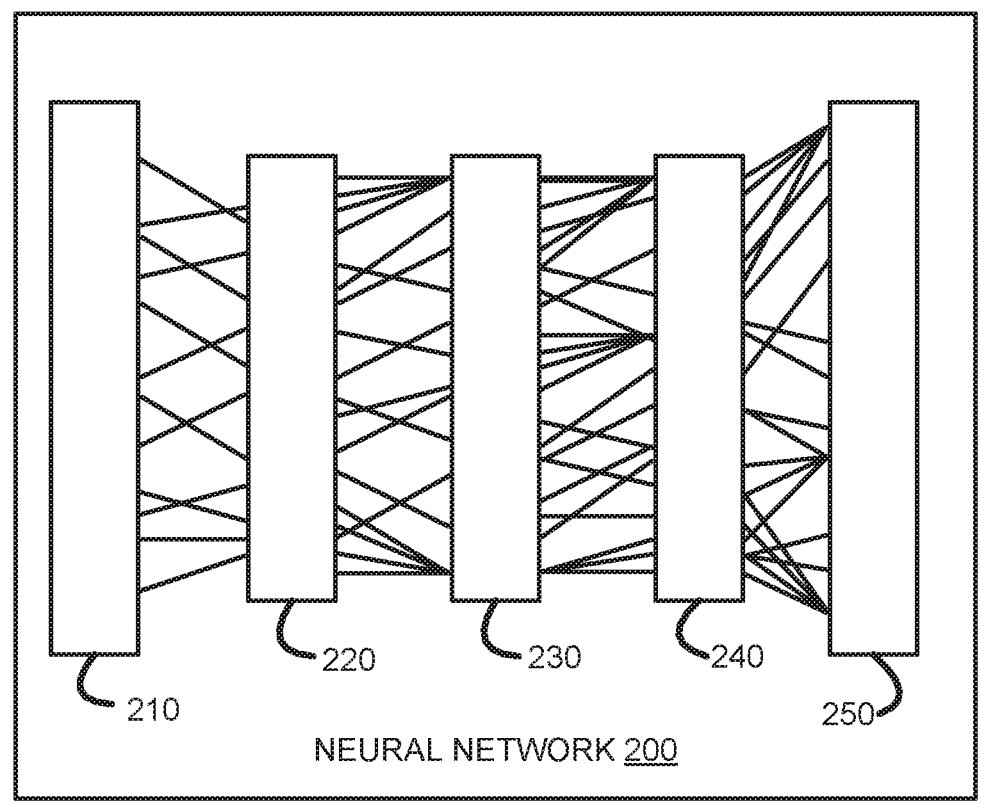
FIG. 2 illustrates a block diagram of a neural network, according to embodiments of the present disclosure.

FIG. 2 is a block diagram illustrating a neural network 200, according to embodiments of the present disclosure. The neural network 200 (e.g., which may be the same as, or substantially similar to, the neural network 140 of FIG. 1) includes an input layer 210, a hidden layer 220, a biased layer 230, an unbiased layer 240, and an output layer 250. The neural network 200 can include multiple neuron (nodes) arranged in various layers. The nodes from adjacent layers can include connections or edges between them. The connection between nodes have weights associated with them that assist the neural network 200 in evaluating the input received.

The input layer 210 is a layer of the neural network 200 configured to provide information to the neural network 200. The input layer 210 can receive input such as the state 122 and the reward 124 to feed into the neural network 200. In some embodiments, the input layer 210 can input additional information into the neural network 200. For example, the input layer 210 can input the state 122, any previous state of the environment 120, additional feature vectors, current policies of the learning agent 110, and other features related to the learning agent 110.

The hidden layer 220 is a layer of the neural network 200 configured to perform computations and transfer information from one layer to another layer. The hidden layer 220 can comprise a collection of hidden nodes to form the hidden layer 220. While only shown as one layer in FIG. 2, it will be appreciated that the neural network 200 can include multiple hidden layers depending on the configuration of the neural network 200.

Overfitting and underfitting the inputted data can be addressed and regulated with the biased layer 230 and the unbiased layer 240. Low bias can result in the neural network 200 overfitting the data and high bias can result in the neural network 200 underfitting the data. Overfitting occurs when the neural network 200 can learn its training data well but cannot generalize beyond the training data. Underfitting occurs when the neural network 200 is not able to generate accurate predictions on the training data or on validation data.

The biased layer 230 is a layer of the neural network 200 configured to translate an activation function within the neural network 200. An activation function can be defined as the output of a node for a given input or set of inputs. The biased layer 230 can comprise a collection of nodes, or neurons, that store a privileged value to allow for translation of an activation function. The stored value allows the biased layer 230 to translate the activation function to the left or the right.

The unbiased layer 240 is a layer of the neural network 200 configured to translate an activation function in response to the biased layer 230 translating the activation function within the neural network 200. The unbiased layer 240 can comprise a collection of nodes, or neurons, that store a privileged value to allow for translation of an activation function. The privileged value can be a value that is only available during training. Merging within the neural network 200 between a biased and non-biased path can be controlled by a limiting function.

The output layer 250 is a layer of the neural network 200 configured to transfer information from the neural network 200 to an outside destination. The output layer 250 can provide a probability that maps to an action based on the inputs received by the neural network 200. For example, if the neural network 200 is inputted with the state 122 and the reward 124 for an action performed by the learning agent 110, then the output to the neural network can be a probability for an action the learning agent 110 may perform next. The probability can then be sent to the teaching agent 130 for evaluation.

Figure 3:
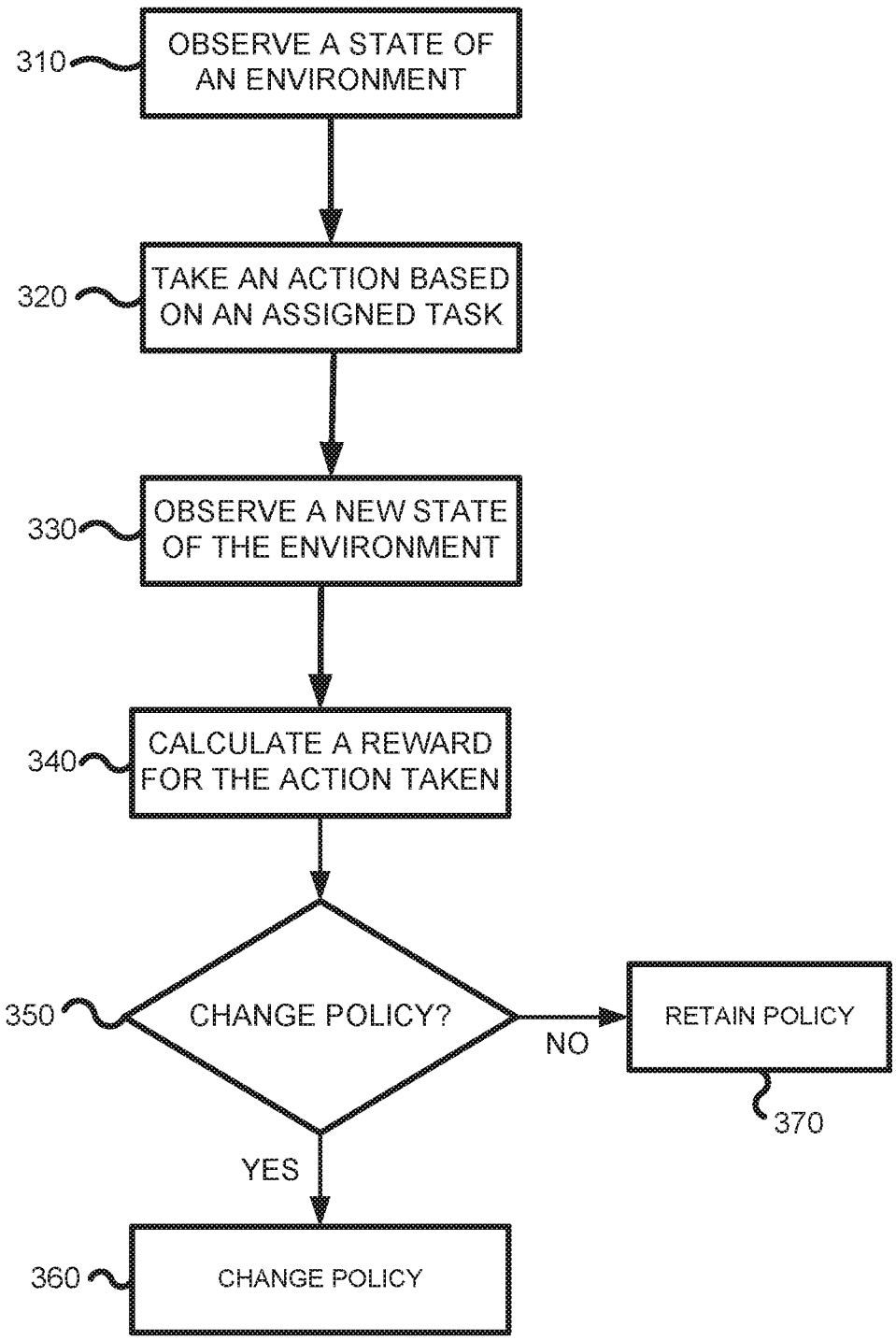
FIG. 3 illustrates a flow diagram of an example process for determining a policy using semi-supervised reinforcement learning model, according to embodiments of the present disclosure.

FIG. 3 is a flow diagram illustrating a process 500 for determining a policy for a learning agent, according to embodiments of the present disclosure. For example, the learning agent 110 and the policy 115 from the semi-supervised reinforcement learning system 100 of FIG. 1. The process 300 may begin by having the learning agent 110 observe a state of the environment 120. This is illustrated at step 310. The environment 120 is a current state in regard to the learning agent 110 interacting with the environment. The learning agent 110 can observe the state of the environment 120 through various means, such as through the use of sensors, direct input, communicatively coupled devices, and the like.

The learning agent 110 takes an action in relation to the observed state of the environment 120. This is illustrated at step 320. The action can be based on a task assigned to the learning agent 110. For example, if the learning agent is assigned a task of identifying a moving object within the environment 120, the observation may be the location of the object, and the action taken may be to move in a direction toward the moving object. The learning agent 110 can reference the policy 115 to determine an action to take. The learning agent 110 can also weigh the exploration exploitation tradeoff to determine whether or not to perform a different action then the action suggested by the policy.

The learning agent 110 observes a new state of the environment 120. This is illustrated at step 330. The new state of the environment can be the state of the environment 120 in response to the action taken by the learning agent 110. The learning agent 110 can observe the new state of the environment 120 through various means, such as through the use of sensors, direct input, communicatively coupled devices, and the like.

A reward function is used to calculate a reward for the action taken. This is illustrated at step 340. A reward function can be a function that assists the learning agent 110 in learning its task better. In some embodiments, the reward function is continuous and differentiable. The reward calculated from the reward function signals whether the learning agent 110 performs a positive action or a negative action in regard to whether or not the learning agent 110 is effectively achieving its assigned task. In some embodiments, the reward function is a stochastic function of the state of the environment 120 and the actions taken.

A determination is made by the teaching agent 130 as whether or not to change the policy 115 related to the learning agent 110. This is illustrated at step 350. In some embodiments, the policy 115 is changed based on a reward threshold. The reward 124 can be evaluated to determine whether it exceeds a threshold set by the reward threshold. A reward threshold can be a predefined threshold set by an administrator for which the actions taken by the learning agent 110 must exceed in order for policy 115 to be changed. For example, if the reward 124 is determined based on the closeness of a true class label, where the true class label is set at 1, the reward threshold is set to 0.9, and the reward 124 received exceeds the reward threshold, then the policy 115 can be altered to correspond with the action taken while the learning agent 110 was in a particular state. This is illustrated at step 360. Otherwise the learning agent retains its current policy as illustrated at step 370.

In some embodiments, the teaching agent 130 inputs a probability from the neural network 140, the state 122, and the reward 124 as feature vectors. The teaching agent 130 outputs a generalized label for those features and compares the label with the action taken. If the label exceeds a reward threshold, then the policy 115 can be altered to correspond with the action taken. This is illustrated at step 360. Otherwise the learning agent 110 retains its current policy as illustrated at step 370.

In some embodiments, the teaching agent 130 inputs a velocity feature vector and an acceleration feature vector from an IoT device 160, such as a position sensor within the environment 120. The state 122 and the reward 124 are inputted as additional feature vectors as well. The teaching agent 130 outputs a generalized label based on those features and compares the label with the action taken by the learning agent 110. If the label exceeds a reward threshold, then the policy 115 can be altered to correspond with the action taken. This is illustrated at step 360. Otherwise, the learning agent 110 retains its current policy as illustrated at step 370.

In some embodiments, the teaching agent 130 inputs a criticality of situation produced by a natural language processor as a feature vector. A sentiment analysis can be performed by the natural language processor 150 for input given by an administrator to generate the criticality of situation. The state 122 and the reward 124 are inputted as additional feature vectors as well. The teaching agent 130 outputs a generalized label based on those features and compares the label with the action taken by the learning agent 110. If the label exceeds a reward threshold, then the policy 115 can be altered to correspond with the action taken. This is illustrated at step 360. Otherwise, the learning agent 110 retains its current policy as illustrated at step 370.

In some embodiments, the teaching agent 130 inputs a probability from the neural network 140, a velocity feature vector and an acceleration feature vector from an IoT device 160, and a criticality of situation from a natural language processor 150. The state 122 and the reward 124 are inputted as additional feature vectors as well. The teaching agent 130 outputs a generalized label based on those features and compares the label with the action taken by the learning agent 110. If the label exceeds a reward threshold, then the policy 115 can be altered to correspond with the action taken. This is illustrated at step 360. Otherwise, the learning agent 110 retains its current policy as illustrated at step 370.

Figure 4:
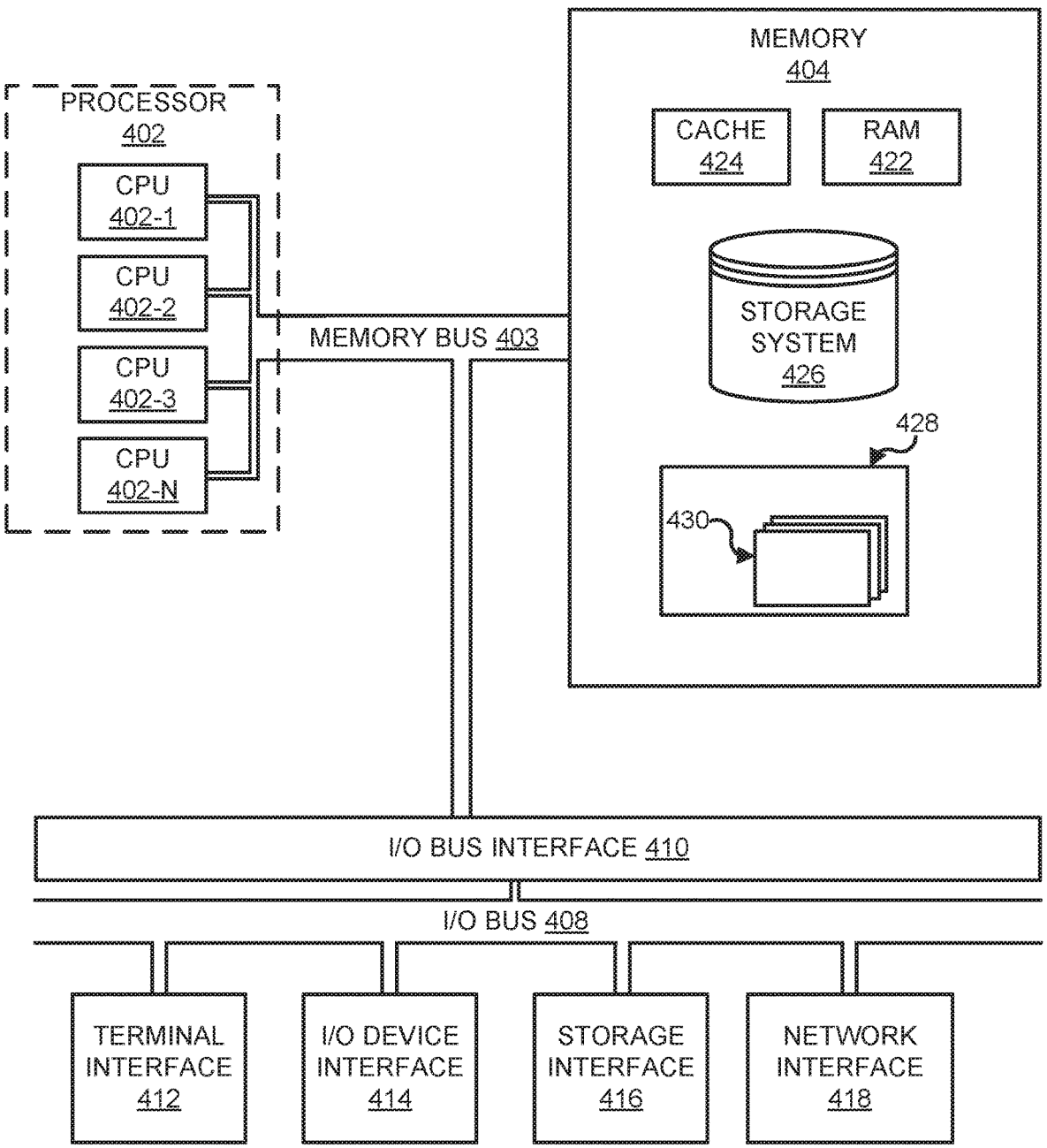
FIG. 4 is a high-level block diagram illustrating an example computer system that may be used in implementing one or more of the methods, tools, and modules, and any related functions, described herein, according to embodiments of the present disclosure.

Referring now to FIG. 4, shown is a high-level block diagram of an example computer system 400 (e.g., the semi-supervised reinforcement learning system 100, the neural network 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, a I/O (Input/Output) device interface 414, a storage interface 416, and a network interface 418, all of which may be communicatively coupled, directly or indirectly, for inter-component communication via a memory bus 403, a I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments the computer system 400 may alternatively be a single CPU system. Each processor 401 may execute instructions stored in the memory 404 and may include one or more levels of on-board cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface, but receives requests from other computer systems (clients). Further, in some embodiments, the computer system 400 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
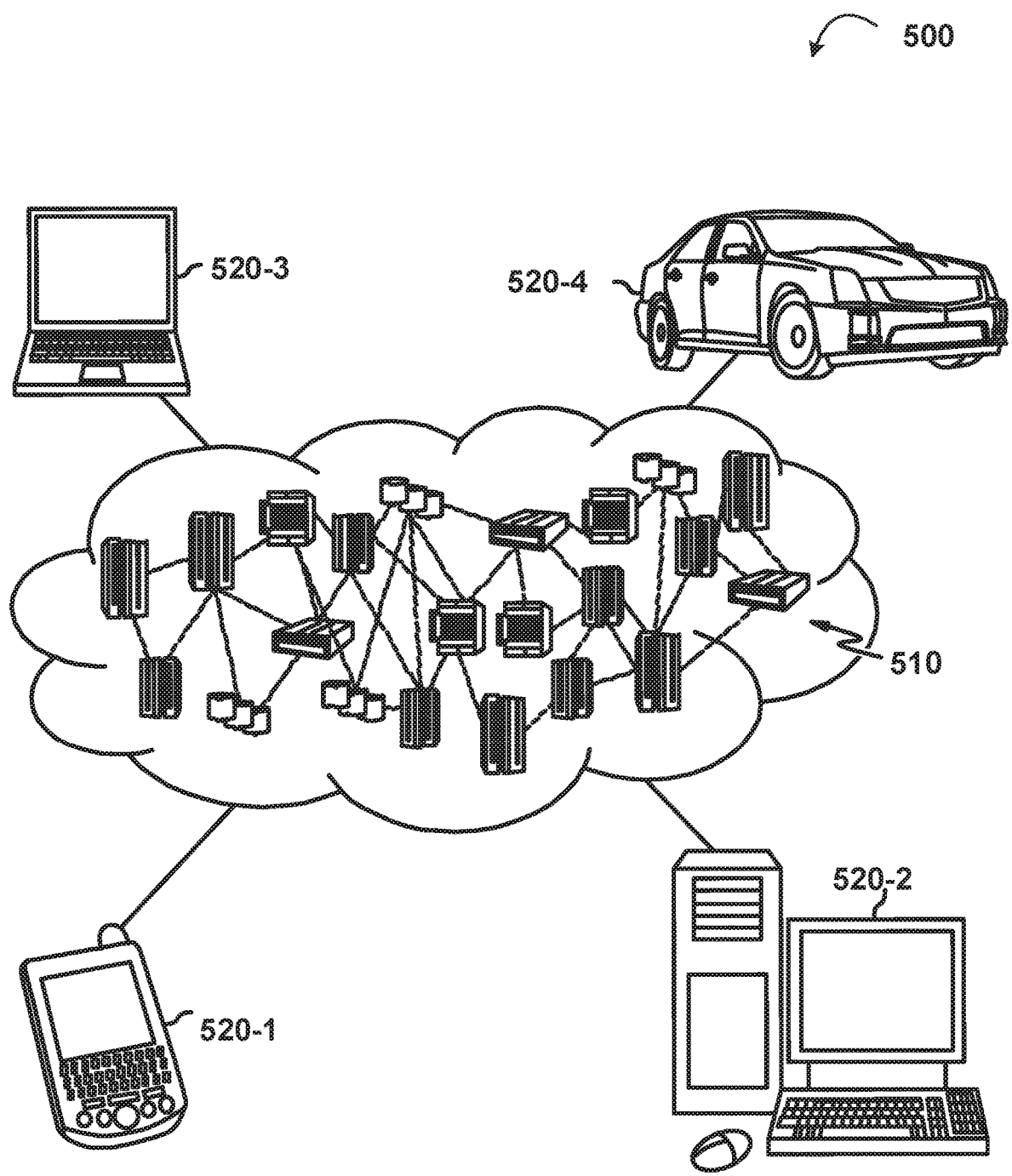
FIG. 5 depicts a cloud computing environment, in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 10 and cloud computing environment 500 can communicate with any type of computerized device over any type of network and/or network addressable connection (e.g., using a web browser).

Figure 6:
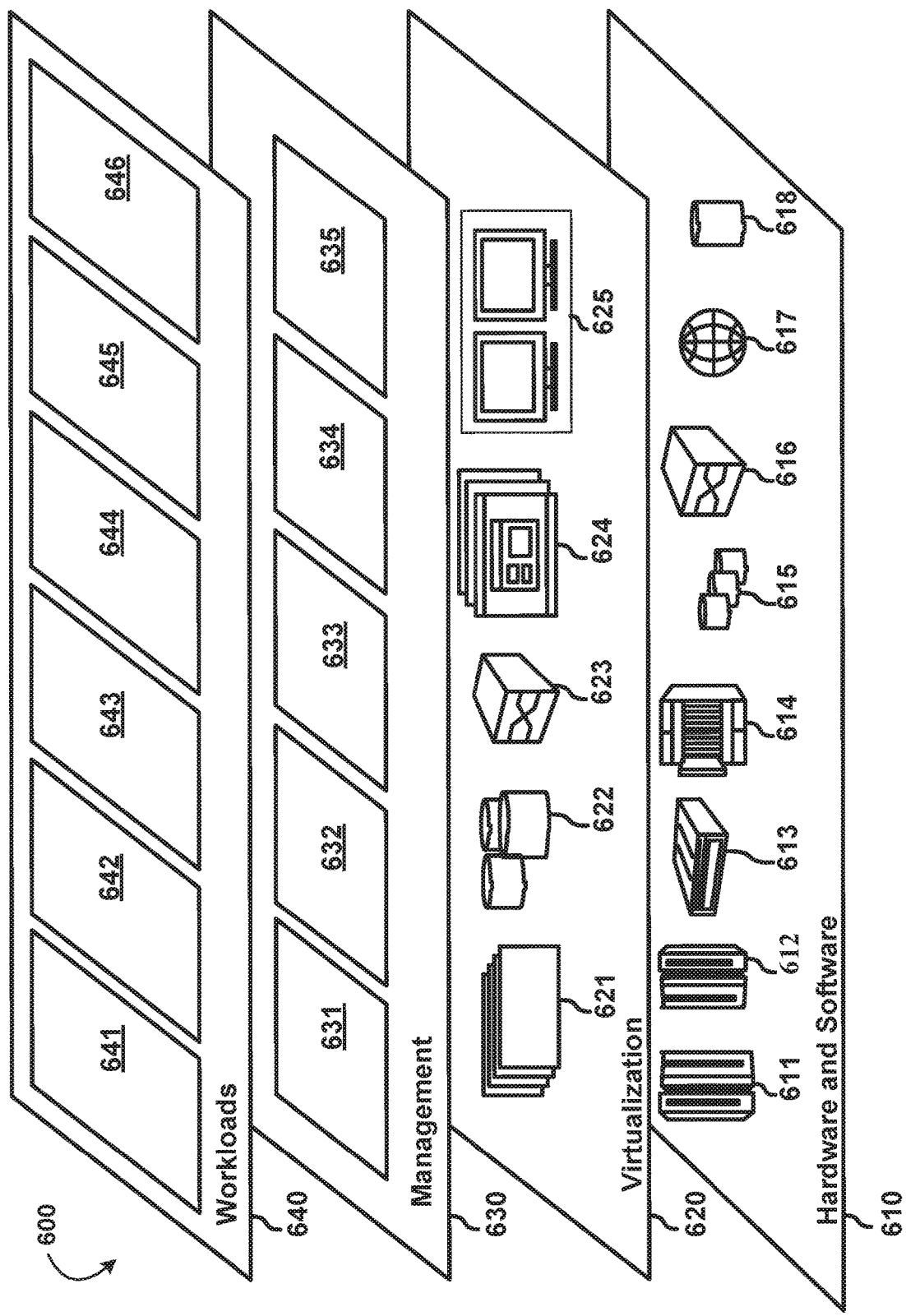
FIG. 6 depicts abstraction model layers, in accordance with embodiments of the present disclosure.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes 611; RISC (Reduced Instruction Set Computer) architecture based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment may be utilized. Examples of workloads and functions which may be provided from this layer include: mapping and navigation 641; software development and lifecycle management 642; virtual classroom education delivery 643; data analytics processing 644; transaction processing 645; and semi-supervised reinforcement learning processing 646 (e.g., the semi-supervise reinforcement learning system 100).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a policy related to moving objects in an environment, the computer-implemented method comprising:
    observing a state of an object in an environment by a learning agent;
    taking an action, by the learning agent, based on a task assigned to the learning agent and on the state of the object;
    observing a new state of the object by the learning agent;
    calculating a reward for the action taken by the learning agent; and
    providing the reward, the new state of the object, and a velocity vector and an acceleration vector associated with the object to a teaching agent,
    wherein the teaching agent produces a label using features of the reward, the new state of the object, the velocity vector, and the acceleration vector, and
    wherein the teaching agent changes a policy relating to the learning agent to correspond to the action taken by the learning agent in response to the label exceeding a reward threshold.

2. The method of claim 1, further comprising:
    retaining the policy related to the learning agent upon a determination that the label produced by the teaching agent does not exceed the reward threshold.

3. The method of claim 1, further comprising:
    inputting the new state of the object and the reward to a neural network;
    outputting, by the neural network, a probability for the action taken by the learning agent; and
    providing the probability to the learning agent for analysis.

4. The method of claim 3, wherein the neural network includes an unbiased layer and a biased layer to regulate overfitting and underfitting.

5. The method of claim 1, further comprising:
    detecting, by a sensor, a velocity and an acceleration related to the object within the environment;
    generating the velocity vector related to the velocity and the acceleration vector related to the acceleration; and
    providing the teaching agent with the velocity vector and the acceleration vector for analysis.

6. The method of claim 1, wherein the teaching agent is trained with a velocity feature vector and an acceleration feature vector, wherein the velocity feature vector and the acceleration feature vector relate to the object within the environment and produced by an IoT device.

7. The method of claim 1, further comprising:
    determining a criticality of situation by a natural language processor; and
    providing the teaching agent with the criticality of situation.

8. The method of claim 7,
    wherein the criticality of situation is another feature used by the teaching agent to produce the label.

9. The method of claim 7, wherein the natural language processor determines the criticality of situation by analyzing an input from an administrator.

10. A system comprising:
a learning agent configured to take an action based on a state of an object in an environment and a policy related to the learning agent, wherein the action produces a new state of the object in the environment;
a neural network configured to produce a probability for the action taken, wherein the new state of the object and a reward related to the action are inputted into the neural network to produce the probability;
a teaching agent configured to produce a label using features of the new state of the object, the reward, a velocity vector, and an acceleration vector associated with the object to produce the label, wherein the teaching agent changes the policy related to the learning agent to correspond to the action taken by the learning agent in response to the label exceeding a reward threshold;
a remote sensor configured to detect the object within the environment and determine the velocity and the acceleration related to the object, the remote sensor further configured to provide the teaching agent with the features of the velocity vector and the acceleration vector related to the velocity and the acceleration respectively; and
a natural language processor configured to analyze speech and text provided by an administrator observing the action taken by the learning agent, the natural language processor further configured to provide the teaching agent with an output produced.

11. The system of claim 10, wherein the neural network includes an unbiased layer and a biased layer, wherein the unbiased layer and the biased layer regulate overfitting and underfitting.

12. The system of claim 11, wherein the teaching agent is configured to input the probability, based on the unbiased layer and the biased layer, as an additional feature in determining the label.

13. The system of claim 10, wherein the teaching agent is initially trained with a labeled data in a controlled environment.

14. The system of claim 10, wherein the natural language processor is configured to perform a sentiment analysis on the speech and provide a sentiment level related to the sentiment analysis to the teaching agent.

15. The system of claim 14, wherein the teaching agent is configured to input the sentiment level as an additional feature in determining the label.

16. A computer program product comprising a computer readable storage medium having program instructions embodied therewith, the program instructions executable by a processor to cause the processor to:
observe a state of an object in an environment by a learning agent;
take an action, by the learning agent, based on a task assigned to the learning agent and on the state of the object;
observe a new state of the object by the learning agent;
calculate a reward for the action taken by the learning agent; and
provide the reward, the new state of the object, and a velocity vector and an acceleration vector associated with the object to a teaching agent,
wherein the teaching agent produces a label using features of the reward, the new state of the object, the velocity vector, and the acceleration vector, and
wherein the teaching agent changes a policy related to the learning agent to correspond to the action taken by the learning agent in response to the label exceeding a reward threshold.

17. The computer program product of claim 16, wherein the program instructions further cause the processor to:
input the new state of the object and the reward to a neural network;
output, by the neural network, a probability for the action taken by the learning agent; and
provide the probability to the learning agent for analysis.

18. The computer program product of claim 16, wherein the program instructions further cause the processor to:
detect, by an Internet of Things (IoT) sensor, a velocity and an acceleration related to the object within the environment;
generate the velocity vector related to the velocity and the acceleration vector related to the acceleration; and
provide the teaching agent with the velocity vector and the acceleration vector for analysis.

* * * * *